(12) United States Patent
Shintani (10) Patent No.: US 9,381,710 B2
(45) Date of Patent: Jul. 5, 2016

(54) TANK AND METHOD OF MANUFACTURING THE SAME

(75) Inventor: Makoto Shintani, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/368,571

(22) PCT Filed: Dec. 28, 2011

(86) PCT No.: PCT/JP2011/080467
§ 371 (c)(1),
(2), (4) Date: Jun. 25, 2014

(87) PCT Pub. No.: WO2013/099010
PCT Pub. Date: Jul. 4, 2013

(65) Prior Publication Data
US 2015/0165703 A1    Jun. 18, 2015

(51) Int. Cl.
| | | |
|---|---|---|
| B29D 22/00 | (2006.01) | |
| B29C 70/32 | (2006.01) | |
| B29C 53/60 | (2006.01) | |
| B29C 53/66 | (2006.01) | |
| B29L 31/00 | (2006.01) | |
| B29C 53/58 | (2006.01) | |

(52) U.S. Cl.
CPC ............ *B29D 22/003* (2013.01); *B29C 53/602* (2013.01); *B29C 53/66* (2013.01); *B29C 70/32* (2013.01); *B29C 53/581* (2013.01); *B29L 2031/7172* (2013.01); *F17C 2203/0604* (2013.01); *F17C 2203/067* (2013.01); *F17C 2203/0619* (2013.01); *F17C 2209/2154* (2013.01); *F17C 2221/012* (2013.01); *F17C 2223/0123* (2013.01); *F17C 2223/036* (2013.01); *F17C 2270/0168* (2013.01); *F17C 2270/0184* (2013.01); *Y02E 60/321* (2013.01)

(58) Field of Classification Search
CPC ..................... F17C 2203/06; F17C 2203/0604; F17C 2203/067; F17C 2209/2154; F17C 2221/012; F17C 2223/0123; F17C 2223/036; F17C 2270/0168; F17C 2270/0184; B29C 53/66; B29C 70/32; B29C 53/581; B29C 53/602; Y02E 60/321; B29D 22/003; B29L 2031/7172
USPC .......................................................... 156/176
See application file for complete search history.

(56) References Cited

FOREIGN PATENT DOCUMENTS

| JP | H5-338044 A | 12/1993 |
|---|---|---|
| JP | H9-183164 A | 7/1997 |
| JP | 2009-052654 A | 3/2009 |

(Continued)

OTHER PUBLICATIONS

Mitsuta Takashi; JP2009-285973 Dec. 10, 2009, Japan Patent Office.*

*Primary Examiner* — Jacob T Minskey
*Assistant Examiner* — Vishal I Patel
(74) *Attorney, Agent, or Firm* — Kenyon & Kenyon LLP (57) ABSTRACT

The present invention provides a method of manufacturing a tank having a reinforcement fiber layer, the method comprising: a winding step of winding a fiber impregnated with resin by a predetermined number of windings; and a curing step of thermally curing the impregnating resin in the wound fiber to thereby form the reinforcement fiber layer. In the winding step, an end portion, being a winding end, of the fiber is tucked into an inner fiber layer which has already been wound to thereby insert at least a portion of a fixing region that is a part of the end portion into between fibers forming the outermost layer so that the end portion is fixed to the inner fiber layer.

1 Claim, 7 Drawing Sheets

(A)  (B)  (C)  (D)  (E)  (F)

(56) References Cited

FOREIGN PATENT DOCUMENTS

| | | |
|---|---|---|
| JP | 2009-138858 A | 6/2009 |
| JP | 2009-174554 A | 8/2009 |
| JP | 2009-191927 A | 8/2009 |
| JP | 2009-285973 A | 12/2009 |

* cited by examiner

TANK AND METHOD OF MANUFACTURING THE SAME

CROSS-REFERENCE TO RELATED APPLICATIONS

This is a national phase application based on the PCT International Patent Application No. PCT/JP2011/080467 filed Dec. 28, 2011, the entire contents of which are incorporated herein by reference.

TECHNICAL FIELD

The present invention relates to a tank having a reinforcement fiber layer and a method of manufacturing the same.

BACKGROUND ART

In a fuel cell system installed in, for example, a fuel cell vehicle, a high-pressure hydrogen tank is used as a fuel gas supply source. The high-pressure hydrogen tank is, in general, manufactured using a filament winding method. Specifically, in the filament winding method, a fiber impregnated with thermosetting resin is wound around an outer periphery of a liner (inner container) and then the resin in the wound fiber is thermally cured. As a result, a reinforcement fiber layer is formed on the outer periphery of the liner to thereby ensure the strength of the high-pressure hydrogen tank.

Since the filament winding method typically uses a fiber impregnated with low-viscosity resin, a terminal end (i.e., a winding end) of the fiber may not be able to be attached with sufficient strength to a winding surface, being a surface formed by the already-wound fiber, and may thus possibly be detached therefrom. In addition, the viscosity of resin is further lowered due to heat during thermal curing and the terminal end of the fiber will become easily loosened. Thus, at the end of winding, an operator has cut the fiber and tightly fixed, by tying or the like, the terminal end of the fiber onto the winding surface.

Another known method for handling the terminal end of fiber, different from the tying and fixing method above, is described in, for example, Patent Document 1 below. In this method, a double-faced tape is adhered to an inner surface of the terminal end of prepreg fiber and the terminal end of the fiber is adhered to the winding surface at the end of winding. In addition, a tank manufacturing method described in Patent Document 2 includes the steps of winding a fiber impregnated with resin by a predetermined number of windings and thermally curing the impregnating resin in the wound fiber to thereby form a reinforcement fiber layer. In the winding step, the terminal end of the fiber is inserted into the already-wound fiber using a jig. More specifically, the terminal end of the fiber is inserted so as to transverse the windings of the already-wound fiber forming the outermost layer in such a way as to hold the terminal end of the fiber between the outermost layer of the already-wound fiber and an inner layer of the outermost layer to thereby hold the terminal end of the fiber by several windings of the already-wound fiber.

However, the method of tying and fixing the terminal end by an operator's hand requires a lot of time and effort. In order to mass-produce tanks, it is desirable to improve the operability of the filament winding method by shortening the time taken for the winding step.

Furthermore, in the method using the double-faced tape in Patent Document 1 and the method of inserting the terminal end of the fiber into the already-wound fiber in Patent Document 2, a portion provided with the double-faced tape or a portion in which the fibers overlap one another as a result of the insertion of the fiber is bulged after thermal curing and is highly likely to cause irregularities to be formed on an outer surface of the resulting tank. Such irregularities not only degrade the appearance of the resulting tank as a finished product but also cause stress concentration and damage therein and further cause degradation of the strength of the reinforcement fiber layer. In addition, the techniques described in Patent Documents 1 and 2 require manual operations by a human and it is thus difficult to be automated.

RELATED ART DOCUMENTS

Patent Document

Patent Document 1: JPH09-183164 A
Patent Document 2: JP2009-285973 A

DISCLOSURE OF THE INVENTION

Problem to be Solved by the Invention

As described above, the techniques described in Patent Documents 1 and 2 above have problems to be solved, i.e., these techniques require manual operation by a human and cause irregularities on a surface.

The present invention has been made in light of such problems and an object of the present invention is to provide a method of manufacturing a tank capable of enhancing a smoothness of a surface of a finished tank and improving operability during manufacturing for mass production, as well as a tank with its surface smoothness being highly ensured.

Means for Solving the Problem

In order to solve the problems above, a method of manufacturing a tank according to the present invention is a method of manufacturing a tank having a reinforcement fiber layer, the method comprising: a winding step of winding a fiber impregnated with resin by a predetermined number of windings; and a curing step of thermally curing the impregnating resin in the wound fiber to thereby form the reinforcement fiber layer. In the winding step, an end portion, being a winding end, of the fiber is tucked into an inner fiber layer which has already been wound to thereby insert at least a portion of a fixing region that is a part of the end portion into between fibers forming an outermost layer so that the end portion is fixed to the inner fiber layer.

The inventors thought that, in the related art tank manufacturing method, a configuration, in which the terminal end of the fiber is inserted into the already-wound fiber in such a way as to transverse the already-wound fiber and the terminal end of the fiber is held by several windings of the already-wound fiber, causes irregularities on the surface of a finished tank. By inserting the terminal end of the fiber into the already-wound fiber in such a way as to transverse the already-wound fiber forming the outermost layer so as to hold the terminal end of the fiber between the outermost layer of the already-wound fiber and a layer on the inner side of the outermost layer, the inserted terminal end of the fiber lifts the already-wound fiber. In other words, the already-wound fiber bulges rapidly, so as to be astride over the inserted terminal end of the fiber, with respect to the other portion.

In the present invention, by tucking the end portion, being a winding end, of the fiber into the inner fiber layer which has already been wound to thereby insert at least a portion of the fixing region that is a part of the end portion into between fibers forming the outermost layer so that the end portion is fixed to the inner fiber layer. By handling the end portion in this way, local bulging in the inner fiber layer into which the end portion is inserted is alleviated. Specifically, the already-wound fiber forming the inner fiber layer is configured such that the fibers are arranged adjacent to each other. By tucking the end portion into the inner fiber layer, the minute space between the adjacent fibers is used to the maximum extent to form the space into which the fixing region that is a part of the end portion is inserted. By forming the space into which the fixing region is inserted, the local bulging in the inner fiber layer is alleviated. In addition, since the terminal end can be handled only by such tucking of the end portion, the operability has greatly been improved.

In the method of manufacturing a tank according to the present invention, it is preferable that, in the winding step, the portion of the fixing region is inserted into between the fibers forming the outermost layer by the tucking of the end portion, and a remainder of the fixing region is arranged in the inner fiber layer that is deeper than the outermost layer.

In such preferred embodiment, since the portion of the fixing region is inserted into between the fibers forming the outermost layer, it is possible to hold the portion of the fixing region while alleviating the local bulging in the outermost layer. In addition, the remainder of the fixing region is arranged in the inner fiber layer that is deeper than the outermost layer, the remainder of the fixing region can be held more securely. Accordingly, it is possible to hold the entire fixing region more securely by the outermost layer and the inner fiber layer that is deeper than the outermost layer while avoiding bulging in the outermost layer.

In the method of manufacturing a tank according to the present invention, it is preferable that the remainder of the fixing region is formed so as to be closer to a distal end of the end portion with respect to the portion of the fixing region In the preferred embodiment, by forming the remainder of the fixing region so as to be closer to the distal end of the end portion, the remainder of the fixing region can be easily arranged on the deeper side in the inner fiber layer.

In the method of manufacturing a tank according to the present invention, it is preferable that the fixing region is bent along a direction intersecting a plane including the outermost layer so that the remainder of the fixing region is arranged in the inner fiber layer that is deeper than the outermost layer.

In the preferred embodiment, since the fixing region is bent in the direction intersecting the plane including the outermost layer so as to be arranged in the inner fiber layer, it is possible to cause frictional force between the remainder of the fixing region and the inner fiber layer to counteract the external force exerted in the direction in which the fixing region is pulled out. Therefore, the end portion of the fiber can be fixed even more securely.

In the method of manufacturing a tank according to the present invention, it is preferable that, in the winding step, a terminal end handling jig is used to handle the end portion, and the terminal end handling jig includes a first portion which is inserted into the inner fiber layer to thereby widen a space between adjacent fibers and a second portion which tucks the end portion into the widened space.

In the preferred embodiment, since the first portion of the terminal end handling jig temporarily widens the space between the fibers, it becomes possible to easily arrange the fixing region in the widened space and thus possible to effectively use the minute space between the adjacent fibers. In addition, since the second portion tucks the fixing region into the space between the adjacent fibers which has been widened by the first portion, the fixing region, being the part of the end portion, can be easily arranged in the inner fiber layer.

In order to solve the problems above, a tank according to the present invention is a tank having a reinforcement fiber layer formed by winding a fiber impregnated with resin and then thermally curing the impregnating resin, wherein: the reinforcement fiber layer includes an end portion, being a winding end, of the fiber and an inner fiber layer which is wound before the end portion; and at least a portion of a fixing region that is a part of the end portion is inserted into between fibers forming an outermost layer of the inner fiber layer so that the end portion is fixed to the inner fiber layer.

In the present invention, at least a portion of the fixing region that is a part of the end portion is inserted into between the fibers forming the outermost layer to fix the end portion to the inner fiber layer. By handling the end portion as described above, local bulging in the inner fiber layer into which the end portion is inserted is alleviated. Specifically, the already-wound fiber forming the inner fiber layer is configured such that the fibers are arranged adjacent to each other. The minute space between the adjacent fibers is used to the maximum extent to form, in the inner fiber layer, the space into which the fixing region that is a part of the end portion is inserted. By forming the space into which the fixing region is inserted as described above, the local bulging in the inner fiber layer is alleviated.

In the tank according to the present invention, it is preferable that the portion of the fixing region is inserted into between the fibers forming the outermost layer and the remainder of the fixing region is arranged in the inner fiber layer that is deeper than the outermost layer.

In the preferred embodiment, since the portion of the fixing region is inserted into between the fibers forming the outermost layer, it is possible to hold the portion of the fixing region while alleviating local bulging in the outermost layer. In addition, since the remainder of the fixing region is arranged in the inner fiber layer that is deeper than the outermost layer, the remainder of the fixing region can be held more securely. Accordingly, it is possible to hold the entire fixing region more securely by the outermost layer and the inner fiber layer that is deeper than the outermost layer while avoiding bulging in the outermost layer.

In the tank according to the present invention, it is preferable that the remainder of the fixing region is formed so as to be closer to a distal end of the end portion with respect to the portion of the fixing region.

In the preferred embodiment, by forming the remainder of the fixing region so as to be closer to the distal end of the end portion, the remainder of the fixing region can be arranged on the deeper side in the inner fiber layer more easily.

In the tank according to the present invention, the fixing region is bent along a direction intersecting a plane including the outermost layer so that the remainder of the fixing region is arranged in the inner fiber layer that is deeper than the outermost layer.

In the preferred embodiment, since the fixing region is bent in the direction intersecting the plane including the outermost layer so as to be arranged in the inner fiber layer, it is possible to cause frictional force between the remainder of the fixing region and the inner fiber layer to counteract the external force exerted in the direction in which the fixing region is pulled out. Therefore, the end portion of the fiber can be fixed even more securely.

Effect of the Invention

The present invention provides a method of manufacturing a tank capable of enhancing the smoothness of a surface of a finished tank and improving operability, as well as a tank with its surface smoothness being highly ensured.

BRIEF DESCRIPTION OF THE DRAWINGS

—FIG. 3(A) shows hoop winding and FIG. 3(B) shows helical winding.

—FIG. 5(A) is an enlarged view showing a state in which a jig is set, as viewed from a direction B in FIG. 4 and FIG. 5(B) shows a state in which the terminal end of the fiber has been handled using the jig.

BEST MODE FOR CARRYING OUT THE INVENTION

Embodiments of the present invention will be described below with reference to the attached drawings. In order to facilitate the understanding of explanation, the same component is denoted by, wherever possible, the same reference numeral in the drawings and redundant descriptions thereof will be omitted. It should be noted that the present embodiment will describe, as an example of tanks, a high-pressure tank capable of storing content at a higher pressure than the normal pressure.

Figure 1:
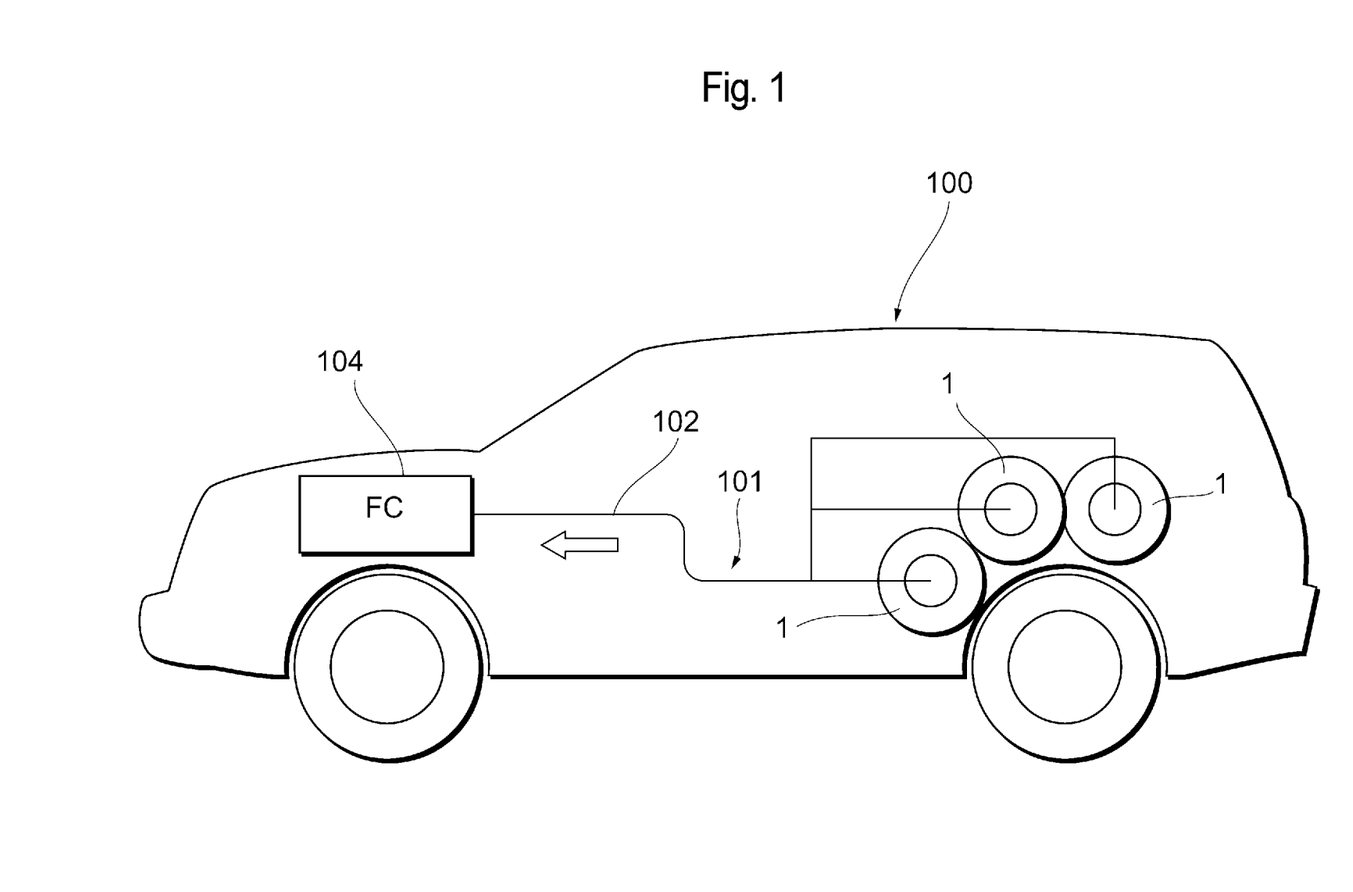
FIG. 1 is a diagram showing a fuel cell vehicle installed with a tank according to an embodiment.

FIG. 1 is a diagram showing a fuel cell vehicle installed with high-pressure tanks according to the present embodiment. As shown in FIG. 1, a fuel cell vehicle 100 is installed with, for example, three high-pressure tanks 1 in a rear portion of a vehicle body. Each high-pressure tank 1 constitutes a part of a fuel cell system 101 and supplies a fuel gas to a fuel cell 104 via a gas supply line 102. The fuel gas stored in the high-pressure tank 1 is a combustible high-pressure gas which is, for example, compressed natural gas of 20 MPa, or hydrogen gas of 35 MPa or 70 MPa. It should be noted that the high-pressure tank 1 may be applied not only to fuel cell vehicles but also to various types of movable bodies (e.g., ships, airplanes and robots) and stationary objects.

Figure 2:
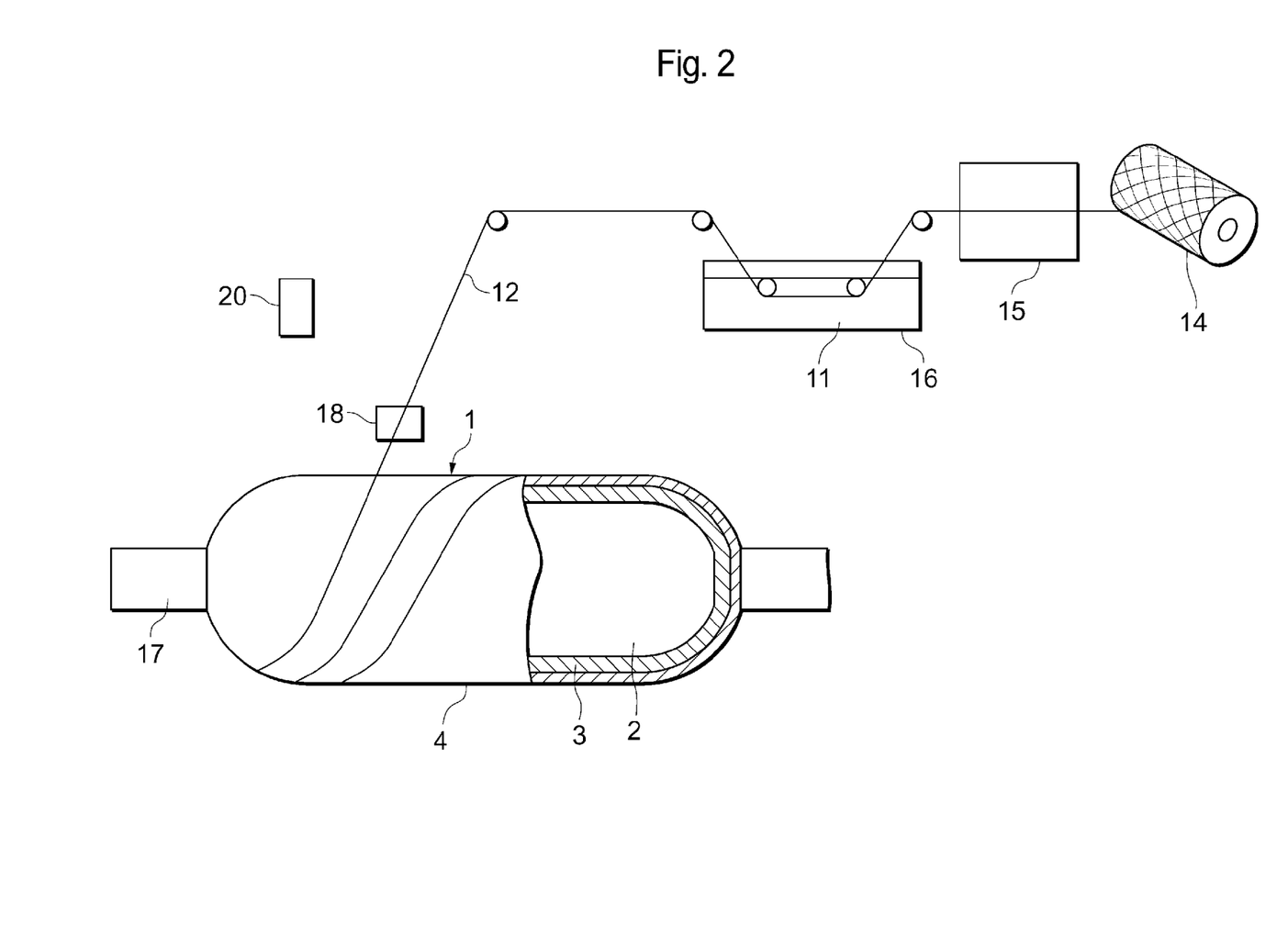
FIG. 2 is a diagram showing the outline of a manufacturing facility for a high-pressure tank according to an embodiment, in which a part of the high-pressure tank is shown in the cross-section.

FIG. 2 is a diagram showing the outline of a manufacturing facility for the high-pressure tank 1, in which a part of the high-pressure tank 1 is shown in the cross-section. As shown in FIG. 2, the high-pressure tank 1 includes a liner 3 which is formed to be a hollow shape so that a storage space 2 is defined therein and a reinforcement fiber layer 4 which covers an outer surface of the liner 3. The fuel gas is supplied and/or discharged between the storage space 2 and the gas supply line 102 via an opening (not shown) formed on one end or formed at the center of both ends in the axial direction of the high-pressure tank 1.

The liner 3 is a portion corresponding to an inner shell or an inner container of the high-pressure tank 1. The liner 3 has a gas barrier property which suppresses permeation of the stored gas to the outside. The material of the liner 3 is not particularly limited, examples of which may include metals, polyethylene resins, polypropylene resins and other types of hard resins.

The reinforcement fiber layer 4 is a portion corresponding to an outer shell or outer container of the high-pressure tank 1 and plays a role for reinforcing the high-pressure tank 1. The reinforcement fiber layer 4 is formed by winding a fiber 12 impregnated with a matrix resin 11 (hereinafter simply referred to as the "resin 11") around an outer surface of the liner 3 and then curing the resin.

The resin 11 is, for example, an epoxy resin, a modified epoxy resin, an unsaturated polyester resin. In this embodiment, a thermosetting epoxy resin is used. The fiber 12 is, for example, metallic fiber, glass fiber, carbon fiber, alumina fiber, aramid fiber and natural organic fiber. Of these fibers, the carbon fiber and aramid fiber are particularly preferable and the carbon fiber is used in this embodiment. Accordingly, the reinforcement fiber layer 4 in the present embodiment is a CFRP in which the epoxy resin 11 is reinforced by the carbon fiber 12.

The fiber 12 is fed from a bobbin 14, subjected to tension adjustment by a tension adjuster 15, and then dipped in a resin bath 16 where the fiber 12 is impregnated with liquid resin 11. The fiber 12 impregnated with the resin 11 is wound around the liner 3 at a predetermined tension. This winding is performed by attaching the liner 3 onto a shaft 17, rotating the liner 3 about the axis together with the shaft 17 and supplying the fiber 12 from a supply unit 18 to the liner 3 that is being rotated. In another embodiment, the fiber 12 supplied from the supply unit 18 to the liner 3 may be a prepreg. In addition, in the present embodiment, a terminal end handling jig 20 is provided for handling a terminal end of the fiber 12. Examples of the winding method may include a filament winding method and a tape winding method. In the present embodiment, the filament winding method (FW method) is used to wind the fiber 12 around the liner 3 by hoop winding and helical winding.

Examples of winding methods may include a filament winding method and a tape winding method. In the present embodiment, the filament winding method (FW method) is used to wind the fiber 12 around the liner 3 by hoop winding and helical winding.

Figure 3:
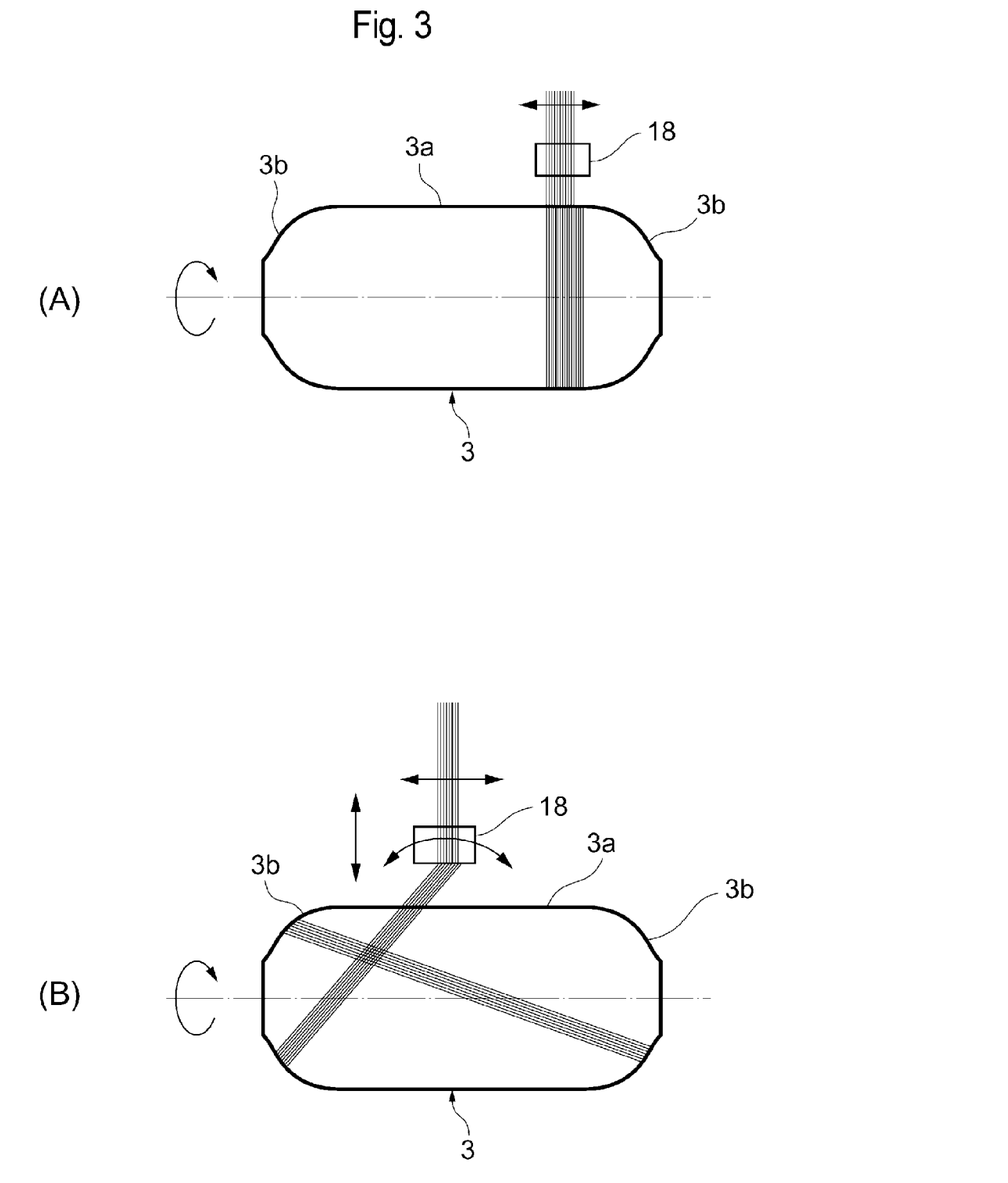
FIG. 3 shows side views of a liner for showing how a fiber is wound

FIG. 3 shows side views of the liner 3 for showing how the fiber 12 is wound—FIG. 3(A) shows hoop winding and FIG. 3(B) shows helical winding. In the present embodiment, the fiber 12 is constituted as bundles of fibers.

As shown in FIG. 3(A), the hoop winding refers to a way in which the fiber 12 is wound circumferentially around a barrel 3a of the liner 3. This hoop winding is performed by, for example, reciprocating the supply unit 18 in the axial direction of the liner 3 and supplying the fiber 12 from the supply unit 18 while rotating the liner 3. A hoop layer formed by the hoop winding ensures the strength of the barrel 3a in the circumferential direction thereof.

As shown in FIG. 3(B), the helical winding refers to a way in which the fiber 12 is helically wound around the barrel 3a of the liner 3 and domes 3b and 3b. This helical winding is performed by, for example, reciprocating the supply unit 18 in the axial direction and radial direction of the liner 3 and supplying the fiber 12 from the supply unit 18 while rotating the liner 3. A helical layer formed by the helical winding ensures the strength of the high-pressure tank 1 in the longitudinal direction thereof.

The reinforcement fiber layer 4 is formed by performing such hoop winding and helical winding more than once and actually constituted by a plurality of layers. The number of layers may be arbitrarily set, which may be, for example, 10 or 30. The order of hoop winding and helical winding may be arbitrarily set and may be designed and changed as appropriate. In the following description, the phrase: "winding the fiber 12" refers to winding the fiber 12 by any of the hoop winding, helical winding or other winding methods, unless otherwise dictated.

Next, a manufacturing method of the high-pressure tank 1, in particular, a process for forming the reinforcement fiber layer 4 will be described. This process includes: a winding step of winding the fiber 12 impregnated with the resin 11 around the liner 3 by a predetermined number of windings using the FW method; and a curing step of thermally curing the impregnating resin 11 in the wound fiber 12. In the winding step, the fiber 12 is wound, by a predetermine number of windings, around the outer periphery of the liner 3 that is being rotated about the axis until it reaches a predetermined thickness. It should be noted that the phrase "winding by a predetermined number of windings" in the winding step includes winding the fiber 12 in an amount needed for forming the entire reinforcement fiber layer 4.

Figure 4:
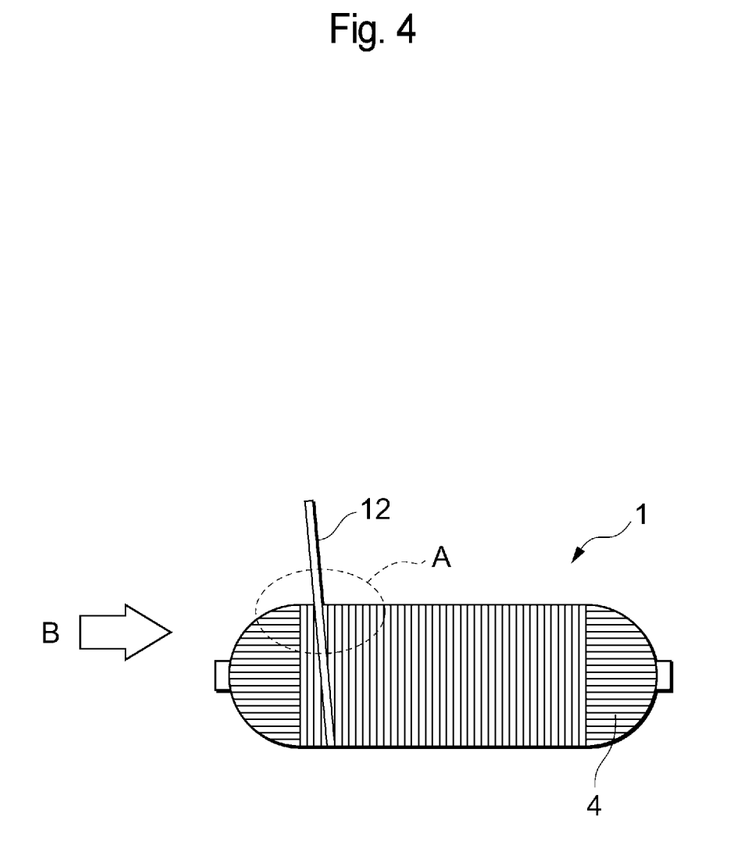
FIG. 4 is an enlarged side view showing how a terminal end of a fiber is handled at the end of a winding step, in which the high-pressure tank is shown with several windings of a fiber left unwound.
Figure 5:
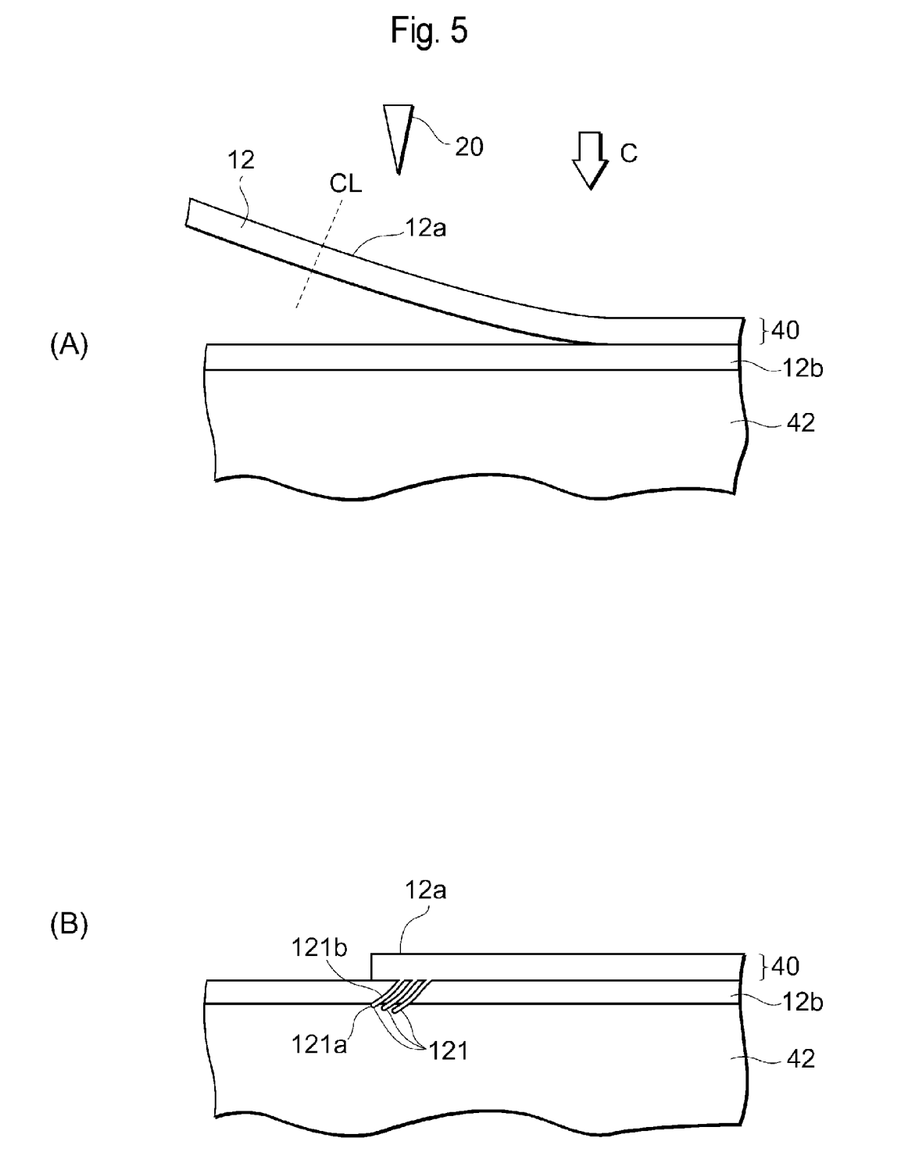
FIG. 5 shows diagrams showing how the terminal end of the fiber is handled at the end of the winding step

Next, a terminal end handling method for the fiber 12 in the present embodiment will be described below with reference to FIGS. 4 and 5. FIG. 4 is an enlarged side view showing how the terminal end of the fiber is handled at the end of the winding step, in which the high-pressure tank is shown with several windings of the fiber left unwound. FIG. 5 shows diagrams showing how the terminal end of the fiber is handled at the end of the winding step—FIG. 5(A) is an enlarged view showing a state in which a jig is set, as viewed from a direction B in FIG. 4 and FIG. 5(B) shows a state in which the terminal end of the fiber has been handled using the jig The terminal end handling jig 20 is used to handle an end portion, being a winding end, of the fiber 12 when the fiber 12 is wound around the liner 3, i.e., to handle a fixing region 12a. As shown in FIG. 5(A), the fiber 12 is cut at a cut line CL with the fixing region 12a, being the winding end, left uncut. This fixing region 12a is handled using the terminal end handling jig 20

The method of handling the fixing region 12a using the terminal end handling jig 20 will be described below in detail. An inner fiber layer 42 is formed on the inner side of an outer fiber layer 40 including the fixing region 12a. The inner fiber layer 42 is formed by several layers of fiber 12. The inner fiber layer 42 is formed from a plurality of fibers 12 arranged side by side so as to be arranged along one another.

The terminal end handling jig 20 tucks the fixing region 12a, being the winding end, of the fiber 12 along an extending direction of fibers 12b which form the outermost layer of the already-wound fiber 12 forming the inner fiber layer 42. Since the fixing region 12a is formed by a plurality of intertwining individual fibers, at least a part of such individual fibers 121 is tucked into the inner fiber layer 42. As a result, at least a part of the individual fibers in the terminal end region 12a is arranged on the inner side of the fibers 12b in a state in which the extending direction of the terminal end region 12a and the extending direction of the fibers 12b forming the outermost layer coincide with each other. It should be noted that, although FIG. 5(B) illustrates a state in which three individual fibers 121 are tucked into the inner fiber layer 42, it may also be preferable that all the fibers constituting the terminal end region 12a are tucked into the inner fiber layer 42.

By handling the terminal end as described above, at least a portion of the fixing region 12a is inserted into between the fibers 12b forming the outermost layer of the inner fiber layer 42. In the present embodiment, a remainder 121a at a distal end of the fixing region 12a (individual fibers 121) enters into the deeper side of the fibers 12b forming the outermost layer of the inner fiber layer 42, and a portion 121b on the already-wound fiber 12 side with respect to the remainder 121a of the fixing region 12a (individual fibers 121) is inserted into between the fibers 12b forming the outermost layer of the inner fiber layer 42.

As shown in FIG. 5(B), the fixing region 12a is bent along a direction intersecting a plane including the outermost layer (the layer formed by the fibers 12b) of the inner fiber layer 42 so as to extend into the inner fiber layer 42. The manner of bending the fixing region 12a is not limited to the above and it is preferable to bend the fixing region 12a so as to form an angle of approximately 90 degrees and to extend vertically toward the axial center of the tank.

Figure 6:
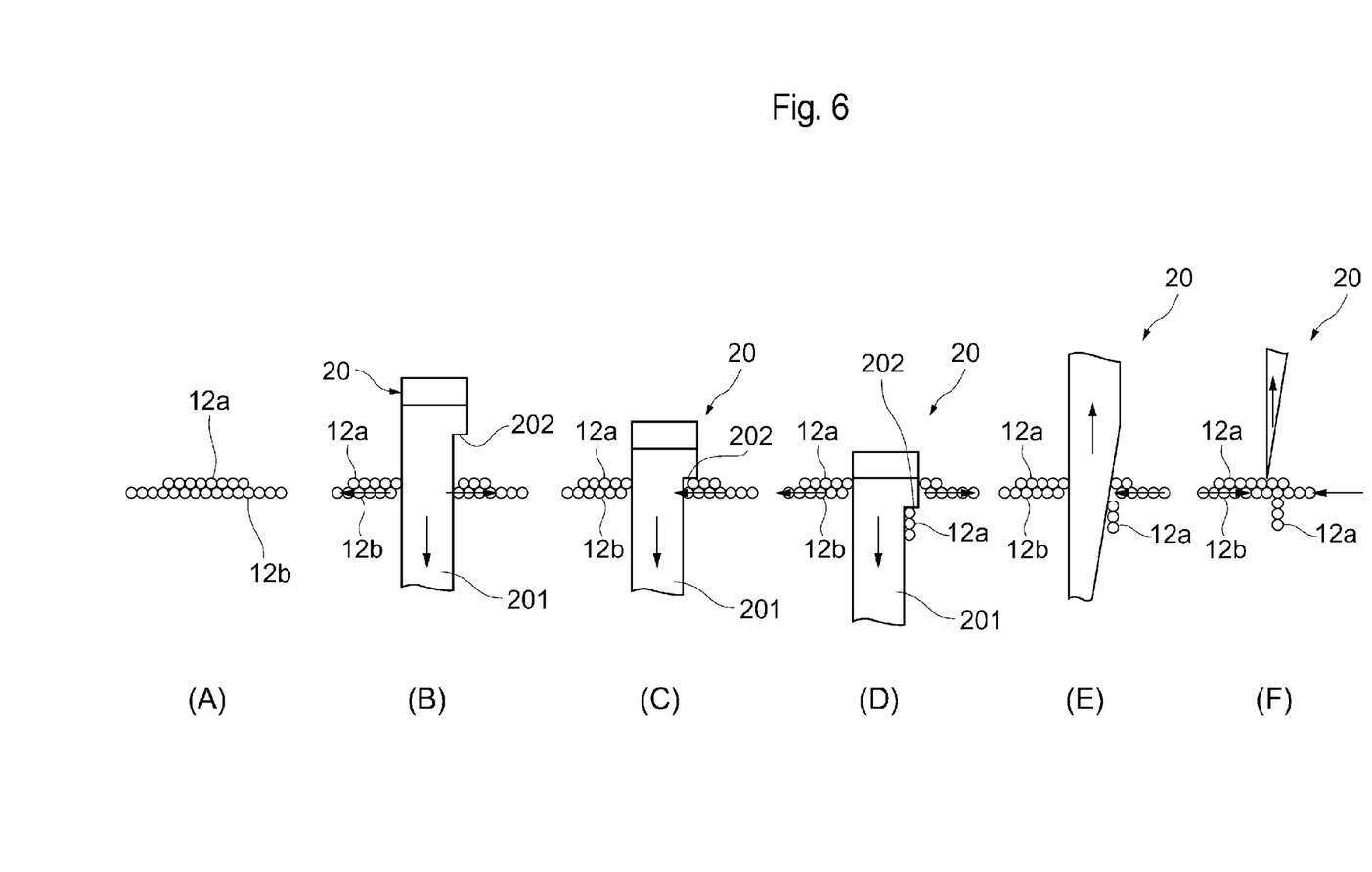
FIG. 6 is a diagram explaining a mechanism for handling the terminal end of the fiber using the jig.

Next, how the fixing region 12a is tucked along and into between the fibers 12b forming the outermost layer will be described below with reference to FIGS. 6(A) to 6(F). FIGS. 6(A) to 6(F) are schematic diagrams showing states as viewed from a direction in which the extending direction of the fiber 12 extends across the plane of paper. FIG. 6(A) shows a state in which the fixing region 12a of the fiber 12 is located on the outer side of the fibers 12b forming the outermost layer. In the state shown in FIG. 6(A), the terminal end handling jig 20 is inserted.

Specifically, as shown in FIG. 6(B), the terminal end handling jig 20 is inserted into the fibers 12b from the fixing region 12a side. The terminal end handling jig 20 includes a first portion 201 and a second portion 202.

The first portion 201 has a shape with a pointed tip end. The first portion 201 is inserted into the fibers 12b forming the outermost layer of the inner fiber layer 42 to thereby widen the space between adjacent fibers 12b. The second portion 202 constitutes a portion closer to the proximal end of the terminal end handling jig 20 with respect to the first portion 201, the second portion 202 having a shape with a hook-like projection. The second portion 202 tucks the fixing region 12a into the space widened by the first portion 201.

As shown in FIG. 6(C), when the terminal end handling jig 20 is being inserted, the second portion 202 of the terminal end handling jig 20 hooks some individual fibers constituting the fixing region 12a and pulls them in the travelling direction of the terminal end handling jig 20. In addition, as the tucking of the terminal end handling jig 20 proceeds, as shown in FIG. 6(D), a portion of the fixed region 12a, being the portion hooked by the second portion 202, enters into between the fibers 12b.

As shown in FIG. 6(E), when the terminal end handling jig 20 is pulled out, the fixing region 12a which has entered into between the fibers 12b is left therein. This can be achieved because the second portion 202 is configured such that it can hook the fixing region 12a only when it moves in a direction in which the first portion 201 of the terminal end handling jig 20 is inserted. Accordingly, the shape of the second portion 202 is not limited to the shape shown in FIGS. 6(A) to 6(F).

As shown in FIG. 6(F), when the terminal end handling jig 20 is pulled out completely, the space between the fibers 12b arranged side by side is narrowed so as to hold the fixing region 12a, which has been tucked therein, unable to be pulled out.

Figure 7:
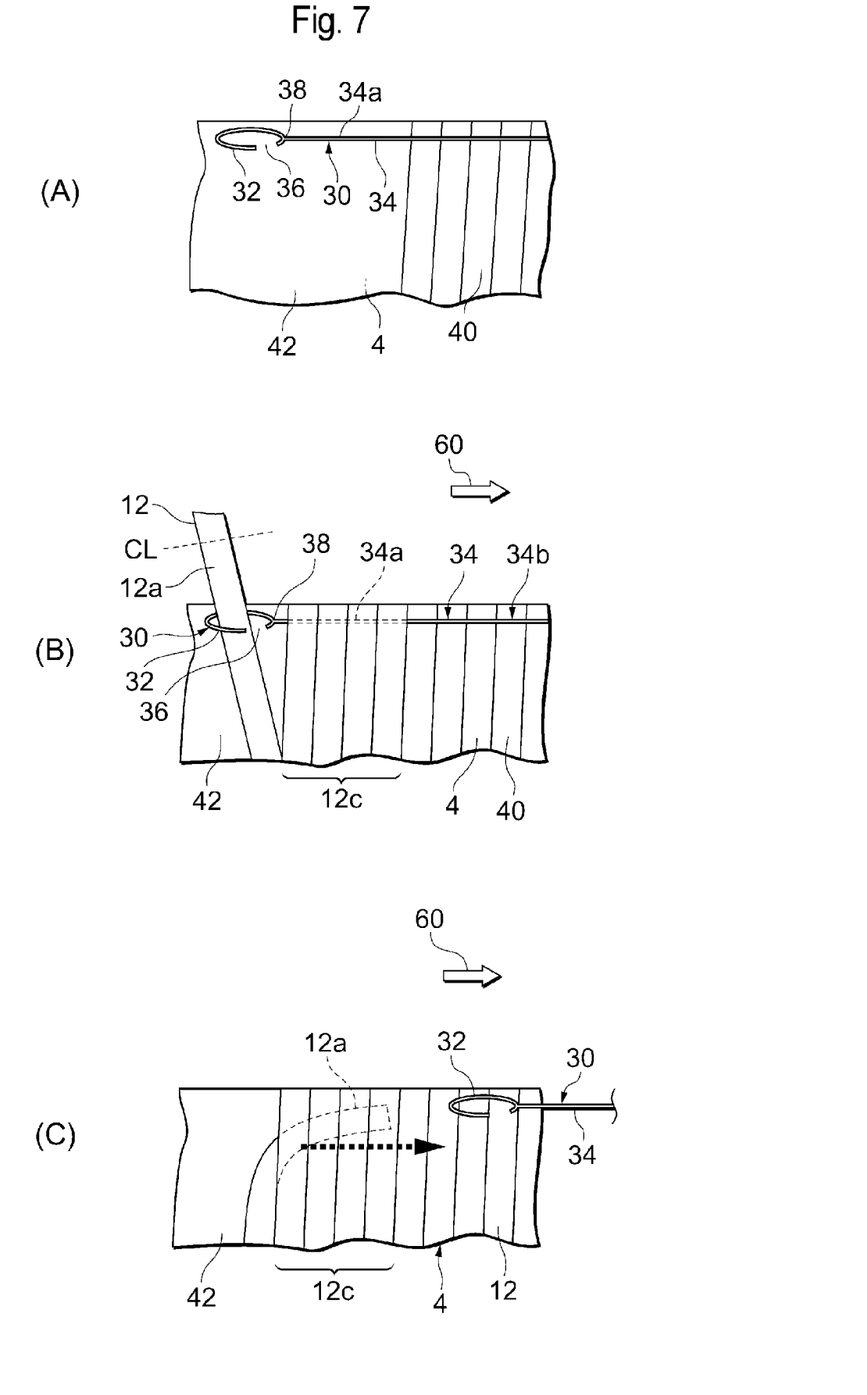
FIG. 7 is a diagram explaining a terminal end handling method using a jig in the related art.

Next, a related art jig 30 and a terminal end handling method using the same will be described below with reference to FIGS. 7(A) to 7(C). As shown in FIG. 7(A), the jig 30 includes a ring 32 and an operation part 34. The ring 32 and the operation part 34 are integrally formed and the operation part 34 is coupled to a part of the ring 32 and extends linearly. The operation part 34 is configured such that a portion thereof on the other side of the ring 32 is operated by an operator, an operation robot, etc. By operating the operation part 34, the position of the ring 32 can be moved along with the operation part 34 with respect to the high-pressure tank 1.

The ring 32 is configured such that the fiber 12, being a bundle of fibers, can be inserted therethrough and such that an inner periphery of the ring 32 can be engaged with the fiber 12. In this example, a notch 36 is formed in a part of the ring 32, although the ring 32 may alternatively be formed as a continuous ring as a whole.

At the end of the winding step, the jig 30 is set horizontally with respect to an outer surface (winding surface) of the already-wound fiber 12, as shown in FIG. 7(A). At this time, the operation part 34 of the jig 30 is placed so as to span an outer fiber layer 40, which will serve as a superficial layer of the reinforcement fiber layer 4 after being cured, and the inner fiber layer 42 around which the remaining fiber 12 is to be wound to form some more windings.

Next, as shown in FIG. 7(B), the remaining fiber 12 (impregnated with resin 11) to form some more windings is wound around the inner fiber layer 42 from above a portion 34a of the operation part 34. Then, the fiber 12 is guided from the notch 36 into the ring 32 to pass therethrough and then cut away. This cutting forms a terminal end region 12a of the fiber 12 at a position after passing through the ring 32. Then, an operation is performed such that the proximal end portion of the terminal end region 12a is hooked by the inner periphery of the ring 32 and a portion 34b of the operation part 34 on the outer fiber layer 40 is pulled in a direction indicated by an arrow 60.

This operation causes the terminal end region 12a so as to be pulled inside the already-wound fiber 12 as shown in FIG. 7(C). More specifically, the terminal end region 12a is pulled into at least a part of fiber windings 12c which correspond to some windings of fiber which was subjected to windings in FIG. 7(B). As a result, the terminal end region 12a is covered with the fiber windings 12c. By continuously operating the operation part 34, the ring 32 is automatically removed from the terminal end region 12a and pulled out of the fiber windings 12c and the entire jig 30 is finally removed out of the pressure tank 1.

As described above, the tank manufacturing method according to the present embodiment is a method of manufacturing a tank having a reinforcement fiber layer, the method including a winding step of winding the fiber 12 impregnated with resin by a predetermined number of windings and a curing step of thermally curing the impregnating resin 11 in the wound fiber 12 to thereby form a reinforcement fiber layer. In the winding step, the fixing region 12a including an end portion, being the winding end, of the fiber 12 is tucked into the already-wound fibers 12b forming the inner fiber layer 42 along the extending direction of the fibers 12b so that the fixing region 12a is arranged on the inner side of the fibers 12b in a state in which the extending direction of the fixing region 12a and the extending direction of the fibers 12b coincide with each other.

The inventors thought that, in the related art tank manufacturing method which has been discussed with reference to FIGS. 7(A) to 7(C), the configuration in which the terminal end of the fiber was inserted into the already-wound fiber in such a way as to transverse the already-wound fiber and the terminal end of the fiber is held by several windings of the already-wound fiber caused the irregularities on the surface of a finished tank. By inserting the terminal end into the already-wound fiber in such a way as to transverse the already-wound fiber, the inserted terminal end of the fiber lifts the already-wound fiber. In other words, the already-wound fiber bulges rapidly, so as to be astride over the inserted terminal end of the fiber, as compared to the other portion.

In this embodiment, the fixing region 12a including an end portion, being the winding end, of the fiber 12 is tucked into between the already-wound fibers 12b forming the outermost layer of the inner fiber layer 42 so as to hold at least a portion of the fixing region 12a by inserting it into the fibers 12b forming the outermost layer, to thereby alleviate local bulging in the inner fiber layer 42 into which the fixing region 12a is inserted.

Specifically, in the outermost layer of the already-wound, inner fiber layer 42, a plurality of fibers 12b are arranged adjacent to each other. By tucking the fixing region 12a into between the fibers 12b, a minor gap between the adjacent fibers 12b is used to the maximum extent to form a space for the fixing region 12a to be inserted into (refer to FIGS. 6(A) to 6(F) and the relevant descriptions). By forming a space for the fixing region 12a to be inserted into, the local bulging in the inner fiber layer 42 is alleviated.

In the present embodiment, by tucking the end portion in the winding step, the portion 121b of the fixing region 12a is inserted into between the fibers 12b forming the outermost layer and the remainder 121a of the fixing region 1a is arranged in the inner fiber layer 42 that is deeper than the outermost layer.

Since a portion of the fixing region 12a is inserted into between the fibers 12b forming the outermost layer as described above, it is possible to hold the portion of the fixing region 12a while alleviating local bulging in the outermost layer. In addition, since the remainder 121a of the fixing region 12a is arranged in the inner fiber layer 42 that is deeper than the outermost layer, the remainder of the fixing region 12a can be held more securely. Accordingly, the entire fixing region 12a can be held more securely by the outermost layer and the inner fiber layer that is deeper than the outermost layer while avoiding bulging in the outermost layer.

In the present embodiment, the remainder 121a of the fixing region 12a is formed so as to be closer to the distal end of the fixing region 12a with respect to the portion 121b of the fixing region 12a.

By forming the remainder 121a of the fixing region 12a so as to be closer to the distal end, the remainder 121a of the fixing region 12a can be arranged on the deeper side in the inner fiber layer 42 more easily.

In the present embodiment, the fixing region 12 is bent along the direction intersecting the plane including the outermost layer to arrange the remainder 121a of the fixing region 12 in the inner fiber layer 42 that is deeper than the outermost layer.

Since the fixing region 12a is bent in the direction intersecting the plane including the outermost layer and arranged in the inner fiber layer 42, it is possible to cause frictional force between the remainder 121a of the fixing region 12a and the inner fiber layer 42 to counteract the external force exerted in the direction in which the fixing region 12a is pulled out. Therefore, the end portion of the fiber can be fixed even more securely.

In the winding step, the terminal end handling jig 20 is used to handle the fixing region 12a. The terminal end handling jig 20 includes the first portion 201 which is inserted into the inner fiber layer 42 to thereby widen the space between adjacent fibers 12b and the second portion 202 which tucks the fixing region 12a into the widened space.

Since the first portion 201 of the terminal end handling jig 20 temporarily widens the space between the fibers 12b, it becomes possible to easily arrange the fixing region 12a in the widened space and thus possible to effectively use the minute space between the adjacent fibers 12b. In addition, since the second portion 202 tucks the fixing region 12a into the space between the adjacent fibers 12b which has been widened by the first portion 201, the fixing region 12a can be easily arranged on the inner side with respect to the fibers 12b.

The high-pressure tank 1 manufactured by the manufacturing method described in the present embodiment has a reinforcement fiber layer which is formed by winding the fiber 12 impregnated with the resin 11 and then thermally curing the resin 11, the reinforcement fiber layer including the fixing region 12a including an end portion, being the winding end, of the fiber 12 and the fiber 12b which has been wound prior to the fixing region 12a to form the inner fiber layer 42.

In such high-pressure tank 1, at least a portion of the fixing region 12a that is a part of the end portion is inserted into between the fibers 12b forming the outermost layer to thereby fix the end portion in the inner fiber layer 42. By handling the end portion as described above, local bulging in the inner fiber layer 42 into which the end portion is inserted is alleviated. Specifically, the already-wound fibers 12b forming the inner fiber layer 42 are configured such that the fibers 12b are arranged adjacent to each other. The minute space between the adjacent fibers 12b is used to the maximum extent to form, in the inner fiber layer 42, the space into which the fixing region 12a that is a part of the end portion is inserted. By forming the space into which the fixing region 12a is inserted, local bulging in the inner fiber layer 42 is alleviated.

DESCRIPTION OF REFERENCE NUMERALS

1: high-pressure tank
2: storage space
3: liner
3a: barrel
3b: dome
4: reinforcement fiber layer
11: resin
12: fiber
12a: fixing region
12b: fiber
12c: fiber windings
14: bobbin
15: tension adjuster
16: resin bath
17: shaft
18: supply unit
20: terminal end handling jig
30: jig
32: ring
34: operation part
34a: portion
34b: portion
40: outer fiber layer
42: inner fiber layer
60: arrow
100: fuel cell vehicle
101: fuel cell system
102: gas supply line
104: fuel cell
121: individual fiber
201: first portion
202: second portion

What is claimed is:

1. A method of manufacturing a tank having a reinforcement fiber layer, the method comprising:
a winding step of winding a fiber impregnated with resin by a predetermined number of windings; and
a curing step of thermally curing the impregnating resin in the wound fiber to thereby form the reinforcement fiber layer,
wherein, in the winding step, an end portion, being a winding end, of the fiber is tucked into an inner fiber layer which has already been wound to thereby insert at least a portion of a fixing region that is a part of the end portion into between fibers forming an outermost layer located on an outer side of the inner fiber layer so that the end portion is fixed to the inner fiber layer, and
the end portion is handled using a terminal end handling jig, the terminal end handling jig including a first portion, which has a pointed tip end, and which is inserted into the inner fiber layer to thereby widen a space between adjacent fibers and a second portion which is located closer to a proximal end of the terminal end handling jig with respect to the first portion, the second portion tucking the end portion into the widened space.

* * * * *